(12) United States Patent
Kaji et al.

(10) Patent No.: US 7,668,064 B2
(45) Date of Patent: Feb. 23, 2010

(54) OPTICAL PICKUP UNIT AND INFORMATION RECORDING/REPRODUCTION APPARATUS

(75) Inventors: Nobuaki Kaji, Yokohama (JP); Sumitaka Maruyama, Yokohama (JP); Akihito Ogawa, Kawasaki (JP); Kazuo Watabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 748 days.

(21) Appl. No.: 11/344,956

(22) Filed: Jan. 31, 2006

(65) Prior Publication Data

US 2006/0187778 A1     Aug. 24, 2006

(30) Foreign Application Priority Data

Jan. 31, 2005   (JP)   ............................. 2005-024481

(51) Int. Cl.
    *G11B 7/00* (2006.01)

(52) U.S. Cl. .......................... 369/109.01; 369/112.01; 369/112.12

(58) Field of Classification Search ............... 369/44.41, 369/112.01, 112.02, 112.1, 112.07, 103, 369/112.12, 44.42, 112.03, 109.01
    See application file for complete search history.

(56) References Cited

U.S. PATENT DOCUMENTS 6,757,227 B2 *   6/2004   Kumagai et al. .......... 369/44.37

6,798,723 B2        9/2004   Hayashi et al.
7,130,259 B2 *   10/2006   Takasuka et al. ....... 369/112.07
7,136,344 B2 *   11/2006   Katayama .............. 369/112.12

FOREIGN PATENT DOCUMENTS

| JP | H05-266491 A | 10/1993 |
|----|--------------|---------|
| JP | H06-168449 A | 6/1994 |
| JP | 3381873 | 8/1995 |
| JP | H07-220284 A | 8/1995 |
| JP | 3361178 | 11/1995 |
| JP | 2000-276745 A | 10/2000 |
| JP | 2001-250262 | 9/2001 |
| JP | 2002-260251 | 9/2002 |
| JP | 2004-5892 | 1/2004 |
| JP | 2004-39165 | 2/2004 |

OTHER PUBLICATIONS

An English Translation of Notice of Reasons for Rejection mailed by the Japan Patent Office for Japanese Patent Application No. 2005-024481 on Dec. 8, 2009.

* cited by examiner

*Primary Examiner*—Nabil Z Hindi
(74) *Attorney, Agent, or Firm*—Knobbe Martens Olson & Bear, LLP (57) ABSTRACT

According to one embodiment, an optical pickup unit which can record, reproduction and erase information in/from an information recording medium has tracks with different pitches, the dividing means has at least a part of a dividing boundary line placing between an end of a 1st order diffraction light with the largest diffraction angle and an end of a 1st order diffraction light with the smallest diffraction angle of the reflected laser beam.

10 Claims, 5 Drawing Sheets

F I G. 6

OPTICAL PICKUP UNIT AND INFORMATION RECORDING/REPRODUCTION APPARATUS

CROSS-REFERENCE TO RELATED APPLICATIONS

This application is based upon and claims the benefit of priority from prior Japanese Patent Application No. 2005-024481, filed Jan. 31, 2005, the entire contents of which are incorporated herein by reference.

BACKGROUND

1. Field

One embodiment of the invention relates to an optical disc recording/reproduction apparatus (information recording/reproduction apparatus) for recording, reproducing and erasing information on/from a recordable, reproducible and erasable optical disc by means of a laser beam.

2. Description of the Related Art

An optical disc is widely used as a recording medium suitable for recording, reproducing and erasing (recording repeatedly) information. Various optical discs of different standards have been proposed and are in actual use. According to the recording capacity, these optical discs are classified into CD and DVD. According to the use (data-recording system), the discs are further classified into a play-only type containing prerecorded information (designated ROM), a write-once type capable of recording information once only (designated R), and a rewritable type (recordable/playable or rewritable type) capable of recording and erasing information repeatedly (designated RAM or RW). A projection type display unit using a digital micromirror device (DMD, trademark) as a space demodulation element has been put into practical use.

As the standard and purpose of optical discs have diversified, it has become required that an optical disc recording/reproduction apparatus be capable of recording information on optical discs of two or more standards, reproducing pre-recorded information, and erasing recorded information. In addition, it is demanded as an essential condition of an optical disc recording/reproduction apparatus that the apparatus be capable of detecting the standard of an optical disc loaded in the apparatus, even if it is difficult to record and erase information.

Therefore, an optical pickup incorporated in an optical disc information recording/reproduction apparatus is required at least to be capable of capturing reflected light from a track or a string of recording marks peculiar to an optical disc and controlling the tracking and focus of an objective lens (optical pickup) regardless of the standard (type) of the optical disc.

It is disclosed by, for example, Japanese Patent Application Publication (KOKAI) No. 2004-39165 has proposed an optical pickup, which divides reflected light from an optical information recording medium (optical disc) into a portion where a 0th order light and a ±1st order diffraction light are overlapped and a portion where they are not overlapped, enters each portion into an independent optical detecting means, obtains a predetermined signal, and, as a result, provides a good tracking error signal.

However, the diffraction angle of the ±1st order diffraction light of the reflected light from the optical information recording medium described in the above document is different depending on the wavelength of the reflected light, the track pitch of the optical information recording medium, etc.

Therefore, in an optical pickup unit which receives reflected light with several wavelengths or reflected light from track pitches of several types of optical information recording media or data areas, it is impossible to uniquely determine the portion where a 0th order light and a ±1st order diffraction light are overlapped and the portion where they are not overlapped.

In addition, a light-dividing means based on the wavelength and track pitch of one reflected light has difficultly in generating a track error signal normally from reflected light from optical information recording media with different wavelengths or different track pitches.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an optical pickup unit which can record, reproduction and erase information in/from an information recording medium has tracks with different pitches, the dividing means has at least a part of a dividing boundary line placing between an end of a 1st order diffraction light with the largest diffraction angle and an end of a 1st order diffraction light with the smallest diffraction angle of the reflected laser beam.

Figure 1:
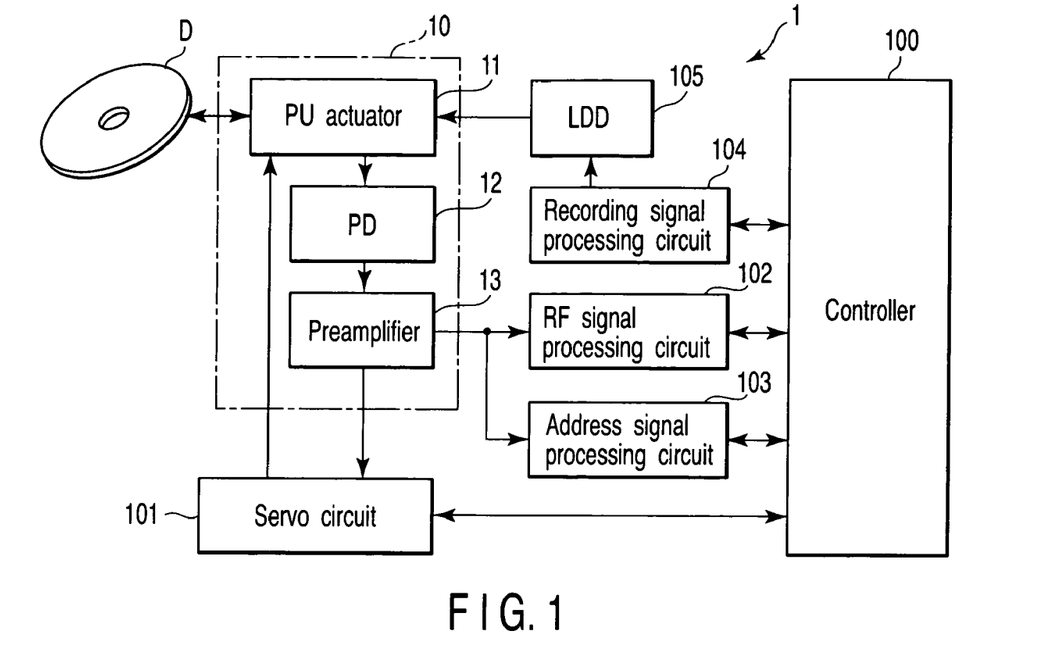
FIG. 1 is an exemplary diagram showing an example of the configuration of an information recording/reproduction apparatus (an optical disc apparatus) according to an embodiment of the invention.

According to an embodiment, as shown in FIG. 1 shown an example of the configuration of an information recording/reproduction apparatus (optical disc apparatus) according to an embodiment of the present invention.

An information recording/reproduction apparatus or an optical disc apparatus 1 shown in FIG. 1 can record or reproduction information on/from an optical disc D by condensing a laser beam emitted from an optical pickup unit (PUH) 10 on the information-recording layer of the optical disc D that is a recording medium.

The optical disc D is held on a not-shown turntable of a not-shown disc motor, and rotated at a fixed speed by the rotation of the disc motor at a fixed speed.

The PUH 10 is moved by a not-shown pickup motor in the diameter direction of the optical disc D, when recording, reproducing or erasing information.

As explained below with reference to FIG. 2, the PUH 10 includes a pick up actuator 11 incorporates a laser diode (LD) 21 to emit a laser beam (an optical beam) with a wavelength of 405 nm, for example, and an objective lens 25 which condenses the optical beam emitted from the LD 21 on the recording surface of the optical disc D, and captures a reflected optical beam from the recording surface (signal surface) of the optical disc D. The wavelength of the laser beam output from the LD 21 is 400 to 410 nm.

The PUH 10 also includes a photodetector (PD) 12 which receives the light beam output from the LD 21 and reflected on the recording surface of the optical disc D and outputs a current or voltage corresponding to the intensity of the reflected light beam, a not-shown focus control coil to move the objective lens 25 in the direction vertical to the surface of the optical disc D, and a tracking control coil 26 to move the objective lens 25 in the diameter direction of the optical disc D.

The signal detected by the PD 12 is applied to a signal processor provided in the later stage, which processes the signal to be usable as a data signal used for reproducing information. The output from the PD 12 is processed to be usable as a control signal to move the objective lens 25 (actuator 11) to a fixed position to the recording surface of the optical disc D, that is, as a focus error signal used to supply the focus control coil with a focus control signal, and as a track error signal used to supply the tracking control coil 26 with a tracking control signal.

As an optical disc D that the PUH 10 of the present invention can read a reflected beam for at least the tracking control, an optical disc of (next-generation) DVD (hereinafter called a HD DVD) capable of recording with higher density compared with a current new-standard DVD optical disc, for example. Of course, various known types of disc, such as, a current standard DVD-RAM/DVD-RW disc capable of recording and erasing information, a DVD-R disc capable of recording new information, and a DVD-ROM disc with prerecorded information are usable.

A laser beam reflected from the optical disc D is detected as an electric signal by the PD 12 of the PUH 10. An output signal of PD 12 is amplified by a preamplifier 13, and applied to a servo circuit (a lens position control unit) 101, an RF signal processing circuit (an output signal processing circuit) 102 and an address signal processing circuit 103 connected to a controller (a lens position control amount setting unit (a main controller)) 100.

The servo circuit 101 generates a focus servo signal of the objective lens 25 held by the PUH 10 (to control the difference between the objective lens and the recording layer of the optical disc D with respect to the focal position of the objective lens), and a tracking servo signal (to control the position of the objective lens in the direction crossing the track of the optical disc D). These generated signals are applied to a not-shown focus actuator and a tracking actuator (a lens position control mechanism) of the PUH 10.

The RF signal processing circuit 102 takes out user data and management information from a signal detected and reproduced by the PD 12. The address signal processing circuit 103 takes out address information, that is, information indicating a track or sector of the optical disc D that the objective lens faces to at that time, and sends it to a controller 100. The controller 100 controls the position of PUH 10 for recording data such as user data at a desired position, or records user data or management information in a desired position, based on the address information.

The controller 100 instructs the intensity of laser beam from a laser element (LD), when information is recorded and played back. By the instruction of the controller 100, data recorded at an address (track or sector) of a desired position can be erased.

When information is recorded on an optical disc, a recording signal processing circuit 104 supplies a laser driving circuit (LDD) 105 with recorded data or a recorded signal demodulated to a recording wave signal suitable for recording on an optical disc. The intensity of the laser beam emits from the laser element 21 of the pick up actuator 11 (PUH 10) changes to meet the proper intensity to record information, according to the laser drive signal supplied from the LDD 105. Thus, information is recorded on the optical disc D.

Figure 2:
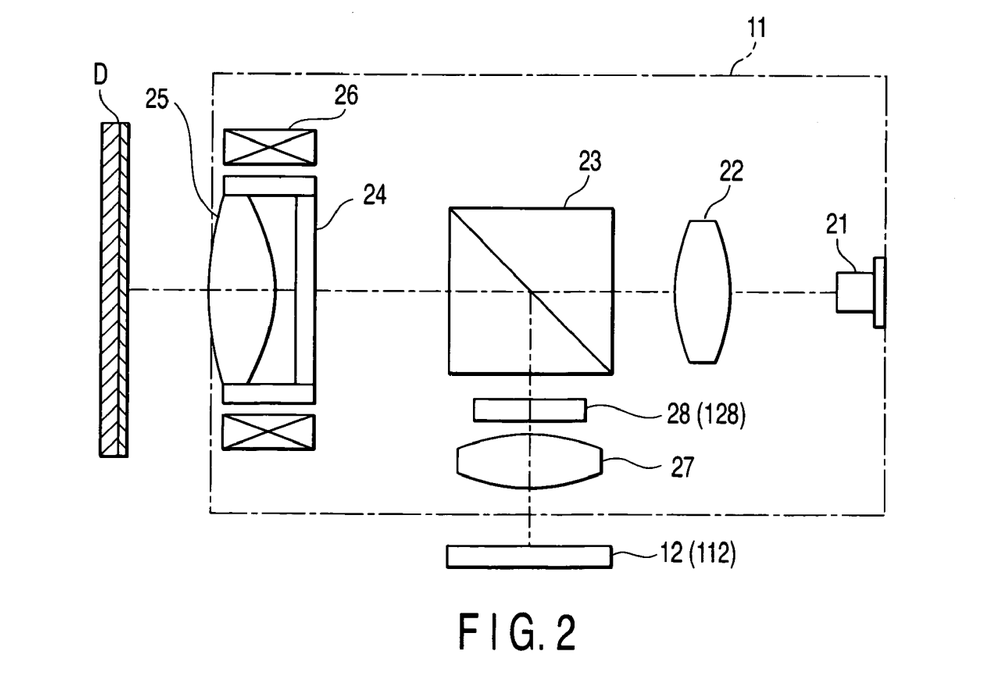
FIG. 2 is an exemplary diagram showing an example of the configuration of an optical pickup of the optical disc apparatus according to an embodiment of the invention shown in FIG. 1.

FIG. 2 shows an example of PUH (optical pickup) of the optical disc apparatus shown in FIG. 1.

The PUH (pickup head) 10 includes a light source 21 that is a semiconductor laser element, for example. The wavelength of a laser beam output from the LD 21 is 405 nm, for example.

A laser beam from the LD (light source) 21 is collimated by a collimator lens 22, and captured by a condensing element or an objective lens (OL) 25 after passing through a polarization beam splitter (PBS) 23 and a ¼ wavelength plate (a polarizing control element) 24 provided at predetermined positions. The laser beam captured by the objective lens 25 is given a fixed convergence by the objective lens 25. (The laser beam from the LD 21 is guided by the objective lens 25, and forms a minimum optical spot at recording surface of the optical disc D when the objective lens 25 is at the focal position.) The objective lens 25 is made of plastic or glass, and has a numerical aperture (NA) of 0.65, for example.

A laser beam reflected on the information recording surface of the optical disc D is captured by the objective lens 25, given a substantially collimated beam shape, and returned to the polarization beam splitter 23. The reflected laser beam from the optical disc D is applied to the ¼ wavelength plate 24, and changed 90° from the polarizing direction of the laser beam advancing to the optical disc D.

The reflected laser beam returned to the polarization beam splitter 23 is turned 90° in the polarizing direction by the ¼ wavelength plate 24, reflected by the polarization beam splitter 23, and focused on the light-receiving surface of a photodetector 12 through a focusing lens 27.

The reflected laser beam is divided into a predetermined number of portions corresponding to arrays of detection areas of the photodetector (PD) 12, when passing through a light-dividing element 28 in a stage before a fixed convergence.

For example, a light-dividing element 28 is made as a diffraction grating, and has several parts where grating pitches or grating angles are different from each other.

In particular, a laser beam emitted from the semiconductor laser (LD) 21 is collimated by the collimator lens 22. This laser beam is a linearly polarized light, passed through a PBS (polarization beam splitter) 23, changed (turned) in the polarizing surface to circular polarizing by the ¼ wavelength plate 25, and condensed on the optical disc D by the objective lens 25.

The laser beam condensed on the optical disc D is demodulated by a pit, mark or group recorded on the optical disc.

The laser beam reflected or diffracted on the recording surface of the optical disc D is collimated again by the objective lens 25, passed again through the ¼ wavelength plate 24, and changed in the polarizing direction by 90° from the advancing path.

In this way, the reflected laser beam whose polarizing direction is changed by 90° from the advancing path is reflected on the polarizing surface of the PBS (polarization beam splitter) 23, passed through the light-dividing element 28, divided into several luminous flux corresponding to the detection areas, of the photodetector (PD) 12, and polarized in a predetermined direction (the distance from the center toward the light-receiving area of the photodetector provided corresponding to each laser beam is changed by each divided area of light-dividing element 28).

The reflected laser beam divided into a predetermined number of portions is condensed in the light-receiving area (described later) of the photodetector 12 through the lens 27.

Figure 3:
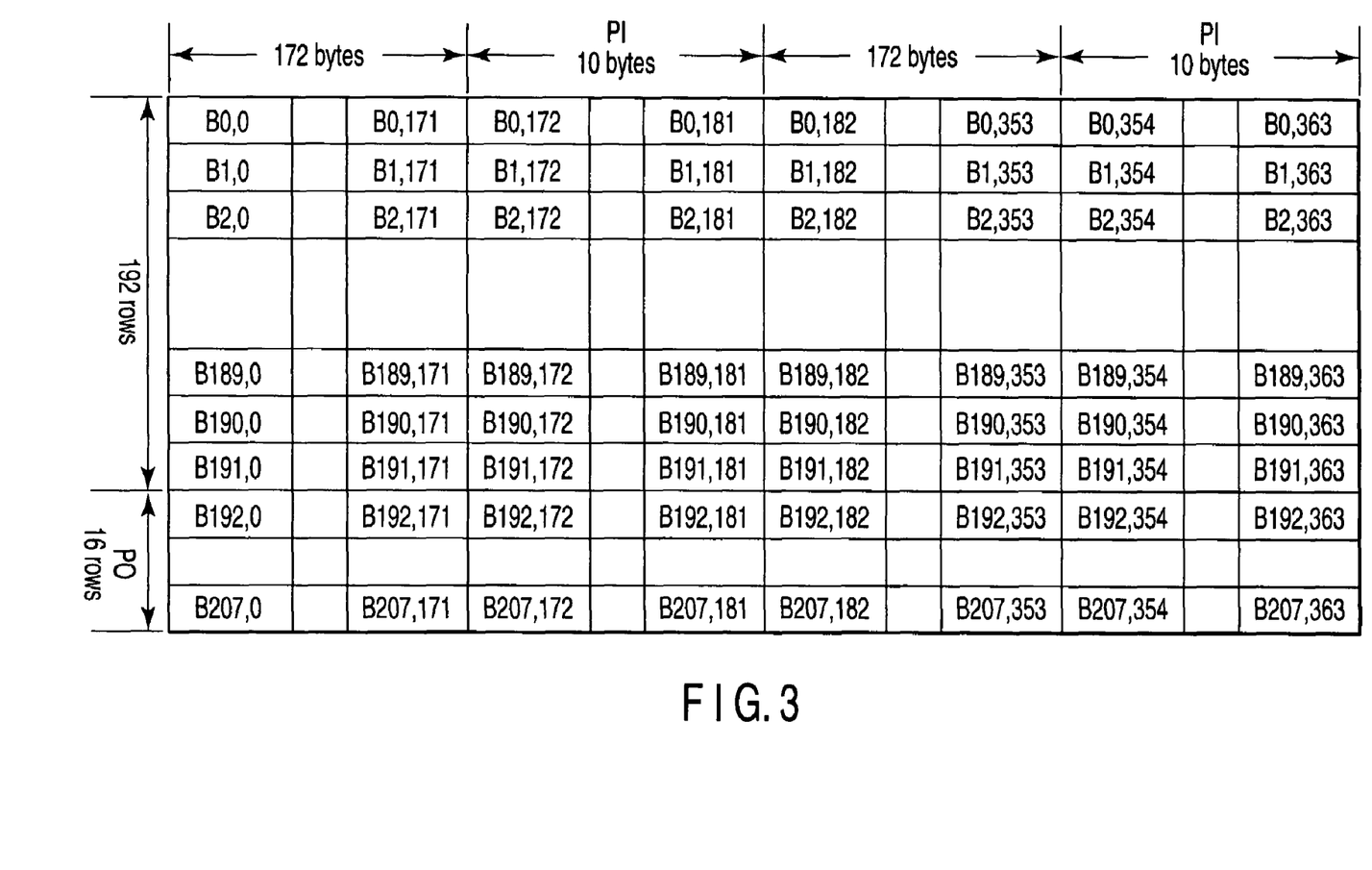
FIG. 3 is a table explaining an example of the configuration of a recording medium (optical disc) capable of being recorded, played back and erased information by the optical disc apparatus according to an embodiment of the invention shown in FIG. 1 and FIG. 2.

FIG. 3 shows the structure of ECC block (HD DVD-ROM, HD DVD-R, HD DVD-ARW discs) of a recording medium (optical disc) capable of recording, reproducing and erasing information with the optical pickup of the present invention.

As shown in FIG. 3, the ECC block is composed of continuous 32 scrambled frames. The scrambled frames are arranged in 192+16 rows in the vertical direction, and (172+10)×2 columns in the horizontal direction.

$B_{0,0}, B_{1,0}, \ldots$, is 1 byte.

PO and PI are error correction codes, and outer parity (Parity Out) and inner parity (Parity In), respectively.

The structure of the ECC block of an optical disc shown in FIG. 3 is a structure using a product sign.

Namely, data to be recorded into an information-recording medium is arranged two-dimensionally (matrix), and given PI (Parity In) in the row direction and PO (Parity Out) in the column direction, as an error correction additional bit.

By configuring an ECC block structure using a product sign, a high error correction capability can be ensured by erasure correction and repetitive vertical/horizontal correction.

The ECC block structure shown in FIG. 3 is different from the ECC block structure used in an optical disc of current DVD standard, and characterized by the provision of PI at two positions in the same row.

In FIG. 3, PI of 10-byte size described at the center is added to the 170 bytes placed on the left side.

For example, PI of 10 bytes from $B_{0, 172}$ to $B_{0, 181}$ is added as PI to the data of 172 bytes from $B_{0, 0}$ to $B_{0, 171}$. PI of 10 bytes from $B_{1, 172}$ to $B_{1, 181}$ is added as PI to the data of 172 bytes from $B_{1, 0}$ to $B_{1, 171}$.

In FIG. 3, PI of 10-byte size described at the right end is added to the 172 bytes placed at the center on the left side.

For example, PI of 10 bytes from $B_{0, 354}$ to $B_{0, 363}$ is added as PI to the data of 172 bytes from $B_{0, 182}$ to $B_{0, 353}$.

In other words, PI of 10 bytes continued from the 172 bytes at the left end in FIG. 3 configures the small ECC block on the left side, and PI of 10 bytes at the right end continued from the central 172 bytes configures the small ECC block on the right side.

In a play-only optical disc of HD DVD standard using a laser beam with a wavelength of 405 nm used for recording and reproduction, a track pitch (track interval) in a data area is 0.4 μm, and a track pitch (track interval) in a system read-in area (where information of the standard of the disc and the data to read or record information at data area is recorded) is defined to 0.68 μm.

Namely, in an optical disc of HD DVD standard, information can be recorded, erased and played back by a laser beam with an wavelength of 405 nm. However, even in an information recording/reproduction apparatus designed for an optical disc of current DVD standard using a laser beam with an wavelength of 650 nm, it is demanded to recognize a HD DVD optical disc when it is set. To meet the demand, a track pitch of the system read-in area is set to 0.68 μm in a system read-in area of such an optical disc of HD DVD standard, so that information can be played back even in an information recording/reproduction apparatus (drive) designed for an optical disc of current DVD standard.

Therefore, when data of (reproduction from) an optical disc of HD DVD standard disc is tried to read in (reproduction from) in a drive adaptable only to an optical disc of current DVD standard (before an optical disc of HD DVD standard is practically used), it is possible to reproduction data from a system read-in area having a track pitch and emboss mark larger than that in a data area.

This means that even a drive adaptable only to an optical disc of current DVD standard can read out (reproduction) data from a system read-in area, and can recognize from the data in the system read-in area that the disc (the optical disc set in the drive) is of a HD DVD standard or an inapplicable disc and not playable (readable), within short time.

A system read-in area is wide in a track pitch and large in emboss that is recording information compared with emboss in a data area, and ensures a large amplitude of a reproduction signal.

Therefore, a reproduction signal with an amplitude larger than a certain threshold value can be easily obtained, even if an optical disc set in a drive (information recording/reproduction apparatus) is any one of different types with different reflectivity (read only optical disc, write-once optical disc and rewritable optical disc). Therefore, the information recorded in at least a system read-in area can be read (played back) even if a drive is restricted in some points. A system read-in area stores data required to read data from a data area, such as, a type of optical disc, a recording density in a data area, and an intensity of a reading laser beam on a disc for reading data from a data area. These data must be read when data is read from or recorded in a data area.

In the optical disc apparatus and optical pickup shown in FIG. 1 and FIG. 2, the reflected laser beam from the information-recording surface of the optical disc D not described in detail is captured by the objective lens 25 and given a fixed convergence by the objective lens 25. In this case, the laser beam is returned to a collimated beam.

The reflected laser beam collimated by the objective lens 25 and polarized linearly by the ¼ wavelength plate 24 by turning 90° from the polarizing direction of a laser beam toward the optical disc D is returned to the beam splitter (PBS) 23.

The reflected laser beam returned to the polarization beam splitter 23 is reflected on the surface of a polarization element, and given a fixed diffraction characteristic to be able to reach each detection area, by the diffraction element 28 according to the number and position of detection (light-receiving) areas of the PD 12.

The reflected laser beam divided into several portions and given a fixed diffraction characteristic is condensed by the focusing lens 27 in each light-receiving area of the PD (photodetector) 12 given a predetermined position and size.

Figure 4:
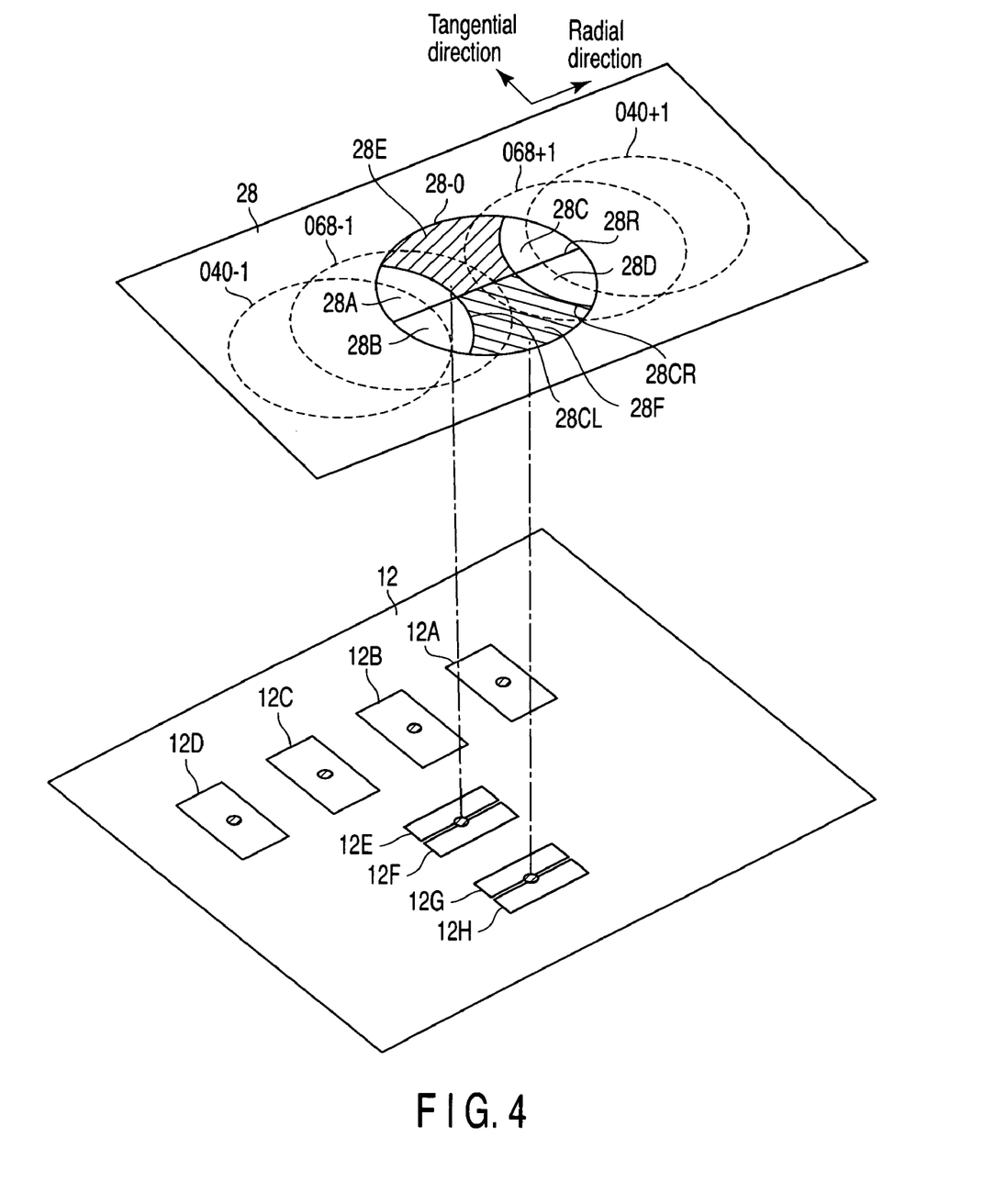
FIG. 4 is an exemplary diagram explaining the relationship between a diffraction element (wavefront-dividing mechanism) and a light-receiving area of a photodetector used in the optical pickup according to an embodiment of the invention shown in FIG. 2.

As shown in FIG. 4, the diffraction element 28 has a grating area (dividing pattern) 28-0 defined to have the same size and position as those of a 0th order light (non-diffraction light) of the reflected laser beam from the optical disc D.

The grating area (light dividing area or pattern) 28-0 is divided into semicircles almost parallel to the radial direction by a boundary line 28R passing through almost the center of the radial direction of optional track of the optical disc D, and divided into 6 areas by two arc-shaped partition lines 28CR and 28CL. Each area is divided by the boundary line 28R into a set of 28A, 28C and 28E and a set of 28B, 28D and 28F.

The areas 28A to 28F are optical patterns functioning as a diffraction grating. Each area or the 6 patterns functioning as a diffraction grating is given a different angle (direction) and pitch.

In the dividing pattern 28-0, the area (pattern) 28C and area (pattern) 28D divided on the right side of the area 28-0 by the partition line 28R is divided by a line segment defined by providing a circle of substantially the same size as the grating area 28-0 at a position of dividing, with almost equal intervals, the place where the circumference of a circle 040+1 defined by a +1st order diffraction light of a reflected laser beam from a data area with a track pitch of 0.4 μm and the circumference of a circle 068+1 defined by ±1st order diffraction light of a reflected laser beam from a system read-in area with a track pitch of 0.68 μm cross with a circle defined by a 0th order light, that is, the circumference of the grating area 28-0.

Likewise, the area (pattern) 28A and area (pattern) 28B divided by the partition line 28L on the left side of the area 28-0 is divided by a line segment defined by a circle of the same size as the grating area 28-0 at a position of dividing, with almost equal intervals, the place where the circumference of a circle 040−1 defined by a −1st order diffraction light of a reflected laser beam from a data area with a track pitch of 0.4 μm and the circumference of a circle 068−1 defined by a −1st order diffraction light of a reflected laser beam from a system read-in area with a track pitch of 0.68 μm cross with a circle defined by a 0th order light, that is, the circumference of the grating area 28-0.

The above system read-in area with a track pitch of 0.68 μm is a data area defined playable (readable) by an optical disc apparatus designed for an optical disc of current DVD standard, in an optical disc of HD DVD standard applied to the present invention, as explained hereinbefore.

As shown in FIG. 4, a light beam divided by the first to sixth areas (patterns) 28A to 28F of the diffraction element 28 is condensed on the light-receiving surface of the light-receiving element (photodetector) 12.

The light-receiving surface of the photodetector 12 has four light-receiving cells 12A, 12B, 12C and 12D placed substantially linearly and independently, and four light-receiving cells 12E, 12F, 12G and 12H arranged in pairs (two make one pair) in the direction orthogonal to the arrangement of the light-receiving cells 12A to 12D.

A reflected laser beam, which is given a diffraction characteristic attainable to a fixed angle and distance in the areas 28A to 28D of the diffraction element 28, is condensed on the light-receiving cells 12A to 12D. In this time, the condensed laser beam forms almost a circular image at the center of the corresponding light-receiving cell.

Between the light-receiving cells 12E and 12F and between 12G and 12H, a reflected laser beam given a diffraction characteristic attainable to a fixed angle and distance in the areas 28E and 28F of the diffraction element 28 is condensed. Namely, each reflected laser beam given a diffraction characteristic attainable to a fixed angle and distance in the areas 28E and 28F of the diffraction element 28 is condensed almost circularly at a central position between the pair of light-receiving cells 12E and 12F and between the pair of 12G and 12H.

The light-receiving cells 12A to 12H output a current of the largeness corresponding to the intensity of an incident laser beam.

Namely, assuming that the current output from the cells 12A to 12H is IA to IH, a focus error signal FES can be obtained by the following equation (equivalent to a double knife-edge method)

$$FES=(IE+IH)-(IF+IG).$$

Similarly, a tracking error signal TES can be obtained by the following equation (equivalent to a push-pull (PP) method)

$$TES=IA+IB-IC-ID.$$

A tracking error signal TES can also be obtained from a phase difference between IA+ID and IB+IC (equivalent to Differential Phase Detection (DPD) method).

Next, explanation will be given on the relationship between the divisions of a reflected laser beam by the diffraction element and the detection areas of the photodetector shown in FIG. 4.

For example, when obtaining a tracking error signal by the PP method, the fact that the intensity of a ±1st order diffraction light changes by a relative position to a guide groove (track) in a radial direction is utilized, and a laser beam condensed in the light-receiving areas 12A, 12B, 12C and 12D of the photodetector 12 mush include a ±1st order diffraction light component when divided by the areas 28A, 28B, 28C and 28D of the diffraction element 28.

Namely, to effect tracking in a data area with a track pitch of 0.4 μm, the outputs IA to ID from the detection areas 12A, 12B, 12C and 12D must be affected by the intensity of a +1st order diffraction light passing through the area 040+1 of the diffraction element 28 or a −1st order diffraction light passing through the area 040−1.

To effect tracking in a data area with a track pitch of 0.68 μm, the outputs IA to ID from the detection areas 12A, 12B, 12C and 12D must be affected by the intensity of a +1st order diffraction light passing through the area 068+1 of the diffraction element 28 or a −1st order diffraction light passing through the area 068−1.

When only a 0th order light is condensed in the detection areas 12A, 12B, 12C and 12D, the modulation factor of a tracking error signal is lowered (the sensitivity is lowered). This is the same when a part of ±1st order diffraction light condensed in the detection areas 12A, 12B, 12C and 12D.

In the present invention, a tracking error signal is obtained from a reflected laser beam component used for generating a tracking signal, by using a diffraction element having diffraction areas 040+1, 040−1, 068+1 and 068−1 divided in an intermediate area between a part where images of a +1st order diffraction light and a 0th light from a data area of an optical disc with a pitch of 0.4 μm are overlapped and a part where images of a ±1st order diffraction light and a 0th order light from a data area with a pitch of 0.68 μm are overlapped. Namely, areas 28A, 28B, 28C, 28D include the overlapped areas of 040+1 and 068+1 or 040−1 and 068−1. And areas 28A, 28B, 28C, 28D is included in the areas of 068+1 or 068−1 (whose overlapped areas with the area 028−0 are bigger than the overlapped areas of 040+1 or 040−1 with the area 028−0.)

Namely, in an optical disc of HD DVD standard having data areas with two kinds of track pitch, tracking can be easily effected for either a data area with a track pitch of 0.4 μm where information can be recorded, played back and erased mainly by an optical disc apparatus of HD DVD standard, and an area with a track pitch of 0.68 μm (a system read-in area)

where information can also be played back by an optical disc apparatus of current DVD standard.

Therefore, a boundary line dividing an area for detecting a light beam to generate a track signal from the other areas is desirably provided between the end of a +1st order diffraction light with the largest diffraction angle (circle 068+1 in this example) and the end of a +1st order diffraction light with the smallest diffraction angle (circle 040+1 in this example), or between the end of a −1st order diffraction light with the largest diffraction angle (circle 068−1 in this example) and the end of a −1st order diffraction light with the smallest diffraction angle (circle 040−1 in this example). By using an optical pickup with this configuration, exact and speedy tracking is possible with a simple configuration.

In an optical disc having areas with different track pitches on the same disc, it is necessary to read information from an optical disc with different track pitches by using one PUH.

In a next-generation DVD, for example, a rewritable optical disc of HD DVD standard and a write once type optical disc, information, such as, a type of disc, a data transfer rate, a data density in data area and an intensity of laser beam suitable for reading data is recorded in a system read-in area with a track pitch of 0.68 μm. Therefore, information recorded in a system read-in area must be read.

If tracking is not effected and data is not exactly read from a system read-in area, data may not be read in a data area with a track pitch of 0.4 μm, and data recorded in an erasable type or write-enable type optical disc may be erased.

Therefore, in the PUH (Optical pickup/pickup head) 10 used for recording information in a next-generation DVD, for example, an optical disc of HD DVD standard, reproducing information from a disc, or erasing information, it is essential to obtain a correct tracking error signal in the track pitches of either a data area capable of recording/erasing information or a system read-in area.

Figure 5:
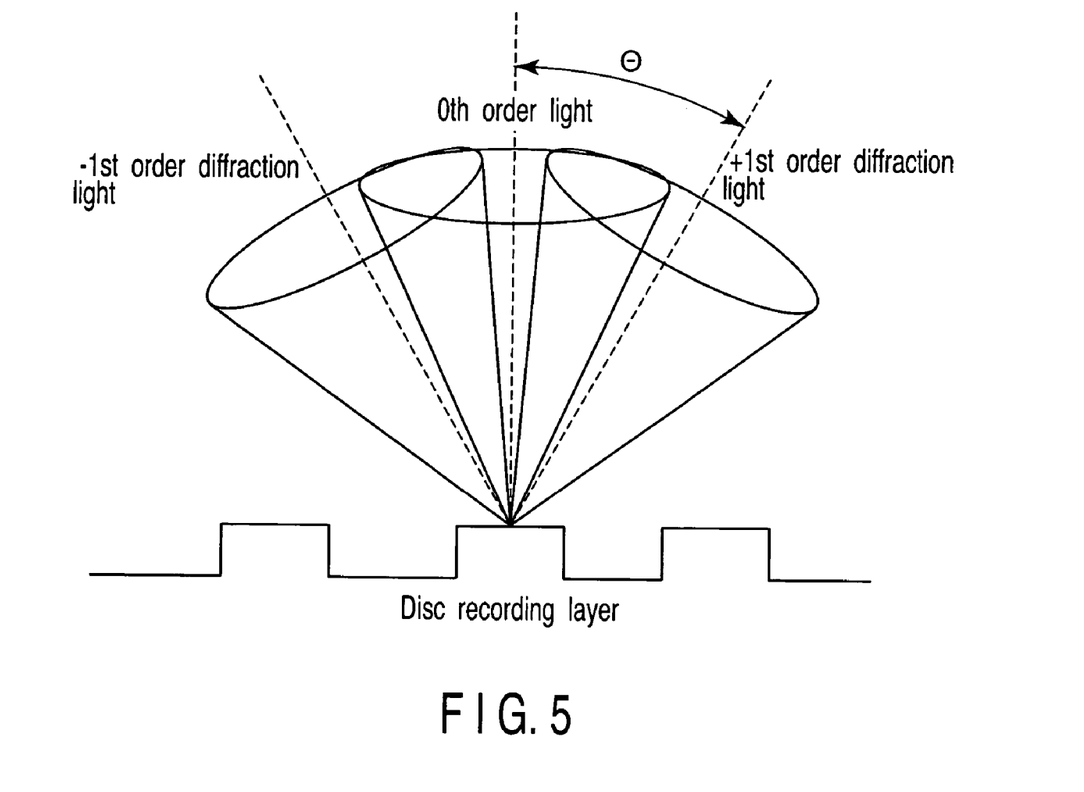
FIG. 5 is an exemplary diagram explaining the relationship between the angles formed by a 0th order light and a ±1st order diffraction light of a reflected laser beam from an optical disc having a track or a guide groove according to an embodiment of the invention.

FIG. 5 shows the angles formed by a 0th light and ±1st order diffraction lights of a reflected laser beam from an optical disc having a track or a guide groove.

As shown in FIG. 5, when a laser beam is reflected from the information recording surface of an optical disc, and a 0th order light is reflected at 90° (vertical) to the recording surface of an optical disc, an angle θ formed by the center of the zero diffraction light and the center of the ±1 order diffraction light is expressed by:

$$\sin \theta = \gamma / P$$

γ: Wavelength of laser beam
P: Track pitch of optical disc

A diffraction angle θ of a + (or −) 1st order diffraction light of a reflected light from an optical disc is different according to the wavelength of a laser beam or a track pitch.

When a difference in the track pitch P increases, a difference in the diffraction angle θ of a + (or −) 1st order diffraction light gradually increases. For example, when a minimum track pitch is assumed to be 1 and a maximum track pitch exceeds 1.5, it is confirmed that a part where a 0th order light and + (or −) 1st order diffraction light are overlapped a reflection light from a track with a minimum track pitch does not exist in a reflected light from a track with a minimum track pitch. Contrarily, a 0th light and + (or −) 1st order diffraction light are completely overlapped in a reflected light from a track with a maximum track pitch.

Namely, in a current PUH (optical pickup) capable of detecting only a 0th order light and ±1st order diffraction light in a reflected light from a track with an optional one track pitch, it is substantially not realized to effect tracking exactly for a track with track pitches of 0.4 μm and 0.68 μm by using only a reflected laser beam from each track pitch.

The optical pickup (PUH) of the present invention can exactly effect tracking for a track with any track pitch, even if a maximum track pitch exceeds 1.5 when a minimum track pitch is assumed to be 1.

Figure 6:
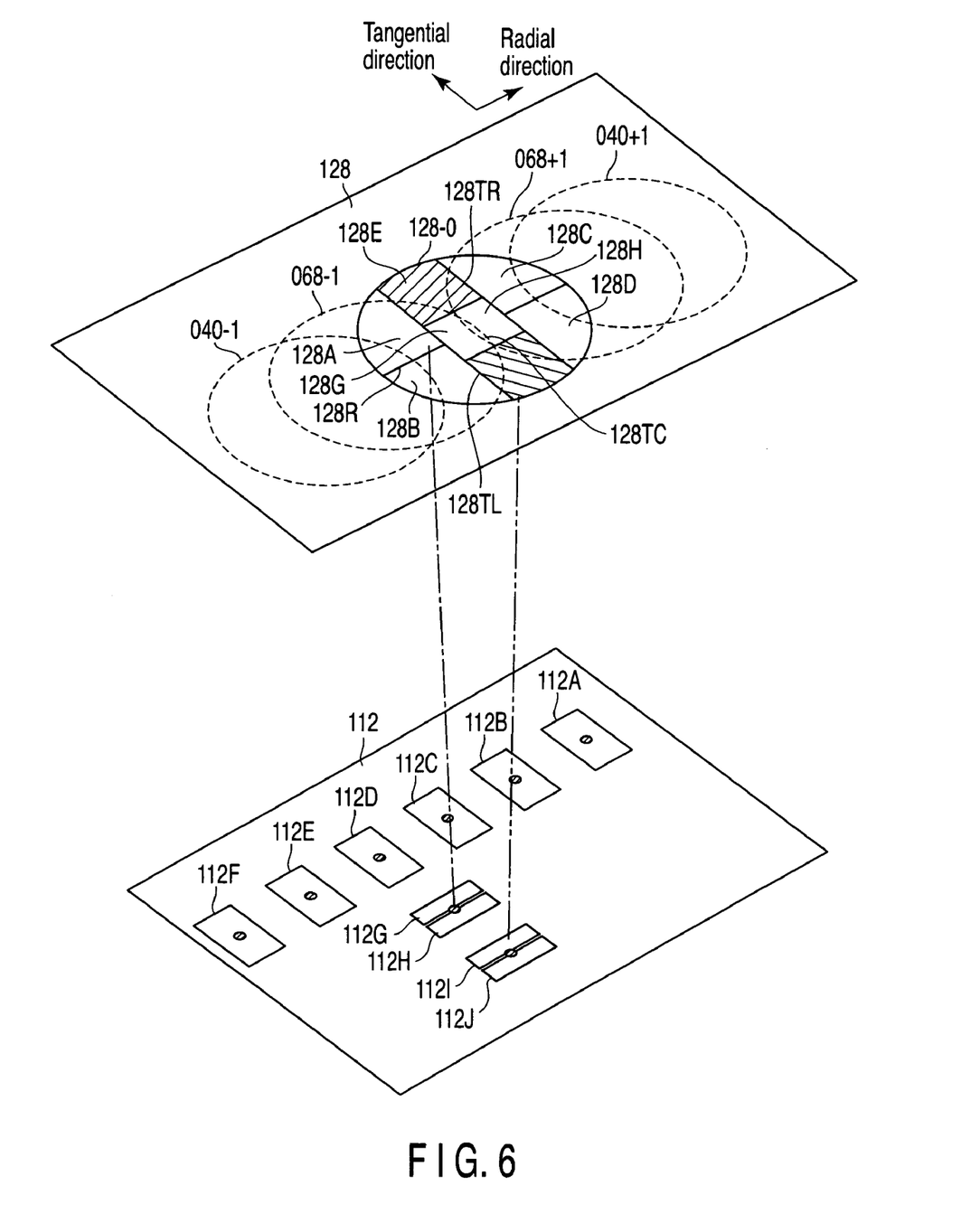
FIG. 6 is an exemplary diagram showing another embodiment of the combination of an area-dividing pattern of a diffraction element and a detection area of a photodetector according to an embodiment of the invention shown in FIG. 4.

FIG. 6 shows another embodiment of the combination of an area-dividing pattern of a diffraction element and a detection area of a photodetector shown in FIG. 4.

A diffraction element 128 (100 is added to a reference numeral to distinguish from FIG. 4) shown in FIG. 6 has a grating area (dividing pattern) 128-0 defined same in the position and size as those of a 0th order light (non-diffraction light) of a reflected laser beam from an optical disc D.

The grating area (dividing pattern) 128-0 is divided into substantially three areas with respect to a radial direction by a straight line (first tangential straight line) 128TR almost parallel to a tangential direction crossing a circle 068+1 that is a +1st order diffraction light from a system read-in area with a track pitch of 0.68 μm without crossing a circle 040+1 that is a +1st order diffraction light from a data area with a track pitch of 0.4 μm, and a straight line (second tangential straight line) 128TL almost parallel to a tangential direction crossing a circle 068−1 that is a −1st order diffraction light from a system read-in area with a track pitch of 0.68 μm without crossing a circle 040−1 that is a −1st order diffraction light from a data area with a track pitch of 0.4 μm. An area divided by the straight lines 128TR and 128TL is divided into two areas 128G and 128H at almost the center by a straight line (third tangential straight line 128TC) defined substantially parallel to the two straight lines.

The grating area (dividing pattern) 128-0 is divided into almost semicircles by a boundary line 128R almost parallel to a radial direction and passing almost the center of the grating area 128-0 and by pairs of areas 128A and 128B, and 128C and 128D at almost the center in a tangential direction.

Therefore, the grating area (dividing pattern) 128-0 is divided into 8 areas in total, consisting of two pairs of areas 128A/128B and 128C/128D (total four) divided by the boundary line 128R passing almost the center of the grating area 128-0, two areas 128G and 128H (total two) defined at almost the center of the grating area 128-0 and almost the center in the radial direction (divided by the third tangential straight line 128TC), and two areas 128E and 128F (total two) between the second tangential straight lines 128TR and 128TL and at the end portions in the tangential direction except the two central areas 128G and 128H.

The areas 128A to 128H are optical patterns functioning as a diffraction rating. Each area or the 8 patterns functioning as a diffraction rating is given a different angle (direction) and pitch.

To distinguish from the light-receiving element (photodetector) 112 (100 is added to a reference numeral to distinguish from FIG. 4) has ten light-receiving areas (cells) 112A to 112K, as shown in FIG. 6.

A light beam applied to the area 128A of the diffraction element 128 is condensed in the cell 112A of the light-receiving element 112, a light beam applied to the area 128B is condensed in the cell 112B, a light beam applied to the area 128C is condensed in the cell 112C, and a light beam applied to the area 128D is condensed in the cell 112D. When a light beam passing through an area of the diffraction element is applied to a cell corresponding to the area, the light is condensed almost circularly at almost the center of the cell.

A light beam applied to the area 128E of the diffraction element 128 is condensed almost circularly at a central position between the light-receiving areas (cells) 112G and 112H of the light-receiving element (PD) 112. A light beam applied to the area 128F is condensed almost circularly at a central position between the cells 112I and 112J.

A current converted photoelectrically by the cells 112A to 112J and output with a largeness corresponding to the intensity of the applied light beam is assumed to I112A to I112J, and a focus error signal FES can be obtained by the following equation (double knife-edge method)

$$FES=(I112G+I112I-I112H-I112J).$$

A tracking signal TES can be obtained by the following equation by using a compensation push-pull method, for example.

$$TES=I112A+I112B-I112C-I112D+k\times(I112E-I112F)$$

k: Coefficient

By using a compensation push-pull method for the tracking, the influence of an offset component of a tracking error signal generated by a displacement of a central component of a laser beam (generally, a main light beam (of a laser beam) handled as being aligned with an axis of an objective lens) from an axis of an objective lens can be decreased, and correct tracing is possible.

By using a DPD method, tracking is possible based on:

$$TES=\text{(phase difference between } (I112A+I112D) \text{ and} \\ (I112B+I112C)$$

In the configuration shown in FIG. 6, as explained hereinbefore, a boundary line dividing an area for detecting a light beam to generate a track signal from the other areas is desirably provided between the end of a +1st order diffraction light with the largest diffraction angle (circle 068+1 in this example) and the end of a +1st order diffraction light with the smallest diffraction angle (circle 040+1 in this example), or between the end of a −1st order diffraction light with the largest diffraction angle (circle 068−1 in this example) and the end of a −1st order diffraction light with the smallest diffraction angle (circle 040−1 in this example). By using an optical pickup with this configuration, exact and speedy tracking is possible with a simple configuration.

As explained above, for exactly tracking an optional track of an optical disc having two or more tracks with different pitches, a tracking error signal is obtained from an output of a photodetector which can obtain a 0th order light (non-diffraction light) and a ±1st order diffraction light generated in each track with a different pitch from a wavefront of a laser beam reflected on the information recording surface of an optical disc, and output a signal corresponding to the intensity of the obtained diffraction light. Therefore, it is possible to effect exact tracking when recording, reproducing or erasing information on/from an optical disc having tracks with different track pitches exceeding a pitch difference of 1.5 times.

In the aforementioned embodiments, a dividing pattern to divide a luminous flux of a reflected laser beam by a diffraction element and an arrangement of corresponding cells (light-receiving areas) of a photodetector are just an example, and not limited to them, as long as a ±1st order diffraction light of a reflected laser beam from two or more tracks with different track pitches can be obtained. In the above explanation, a diffraction element is a type of dividing and polarizing a luminous flux of a reflected laser beam, and only a fixed luminous flux of a reflected laser beam from an optical disc is used for generation of a tracking error signal, but a method of using one of 0th light and ±1st order diffraction light of whole light without dividing a luminous flux is also applicable.

As explained above, in the optical pickup unit and information recording/reproduction apparatus according to the present invention, for exactly tracking an optional track of an optical disc having two or more tracks with different pitches, a tracking error signal is obtained from an output of a photodetector which can obtain a 0th order light (non-diffraction light) and a ±1st order diffraction light generated in each track with a different pitch from a wavefront of a laser beam reflected on the information recording surface of an optical disc, and output a signal corresponding to the intensity of the obtained diffraction light. Therefore, it is possible to control exact tracking of an optical pickup regardless of the kinds and standard of a recording medium when recording, reproducing or erasing information on/from an optical disc having tracks with different track pitches exceeding a pitch difference of 1.5 times.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical pickup unit comprising:
a condensing means for condensing a laser beam on the information recording surface of a recording medium;
a dividing means for dividing a laser beam reflected from the information recording surface of the recording medium; and
an optical detecting means for receiving the reflected laser beam divided by the dividing means,
wherein when the information recording surface of the recording medium has tracks with different pitches, the dividing means has at least a part of a dividing boundary line between an end of a 1st order diffraction light with the largest diffraction angle and an end of a 1st order diffraction light with the smallest diffraction angle of the reflected laser beam.

2. The optical pickup unit according to claim 1, wherein the wavelength of the laser beam is 400 to 410 nm.

3. The optical pickup unit according to claim 2, wherein the information recording surface of the recording medium is provided with data areas having tracks of different pitches, and recorded with information for reading out or writing data a data area having a track with an optional different pitch from/in a data area.

4. An optical pickup unit comprising:
a condensing means for condensing a laser beam on the information recording surface of a recording medium;
a dividing means for dividing a laser beam reflected from the information recording surface of the recording medium; and
an optical detecting means for receiving the reflected laser beam divided by the dividing means,
wherein when the information recording surface of the recording medium has tacks with different pitches, the dividing means has at least a part of a dividing boundary line in between an end of a +1st order diffraction light with the largest diffraction angle and an end of a ±1st order diffraction light with the smallest diffraction angle, or between an end of a −1st order diffraction light with the maximum diffraction angle and an end of a −1st order diffraction light with the smallest diffraction angle of the reflected laser beam.

5. The optical pickup unit according to claim 4, wherein the wavelength of the laser beam is 400 to 410 nm.

6. The optical pickup unit according to claim 5, wherein the information recording surface of the recording medium is provided with data areas having tracks with different pitches in adjacent areas, and recorded with information for reading out or writing data of a data area of a track with an optional different pitch from/in a data area.

7. An information recording/reproduction apparatus comprising:
   a pickup having a condensing means for condensing a laser beam on an information recording surface of a recording medium, a dividing means for dividing a reflected laser beam reflected from the information recording of the recording medium, and an optical detecting means for receiving the reflected laser beam divided by the dividing means;
   a signal processing circuit for sending to the outside a wireless signal, which takes out information recorded on a recording medium from a reflected light from a recording medium detected by the optical detecting means, and
   a main control unit for controlling the operations of the optical pickup unit and signal processing circuit
   wherein when the information recording surface of the recording medium has tracks with different pitches, the dividing means has at least a part of a dividing boundary line between an end of a 1st order diffraction light with the largest diffraction angle and an end of a 1st order diffraction light with the smallest diffraction angle of the reflected laser beam.

8. The information recording/reproduction apparatus according to claim 7, wherein the wavelength of the laser beam is 400 to 410 nm.

9. The information recording/reproduction apparatus according to claim 8, wherein the information recording surface of the recording medium is recorded with information for reading out or writing data of a data area of a track with an optional different pitch from/in a data area.

10. The information recording/reproduction apparatus according to claim 8, wherein the information recording surface of the recording medium is provided with data areas having tracks with different pitches in adjacent areas, and recorded with information for reading out or writing data of a data area of a track with an optional different pitch from/in a data area.

* * * * *